July 6, 1937. K. MURANAKA 2,086,170
RAKE
Filed Dec. 30, 1936 2 Sheets-Sheet 1
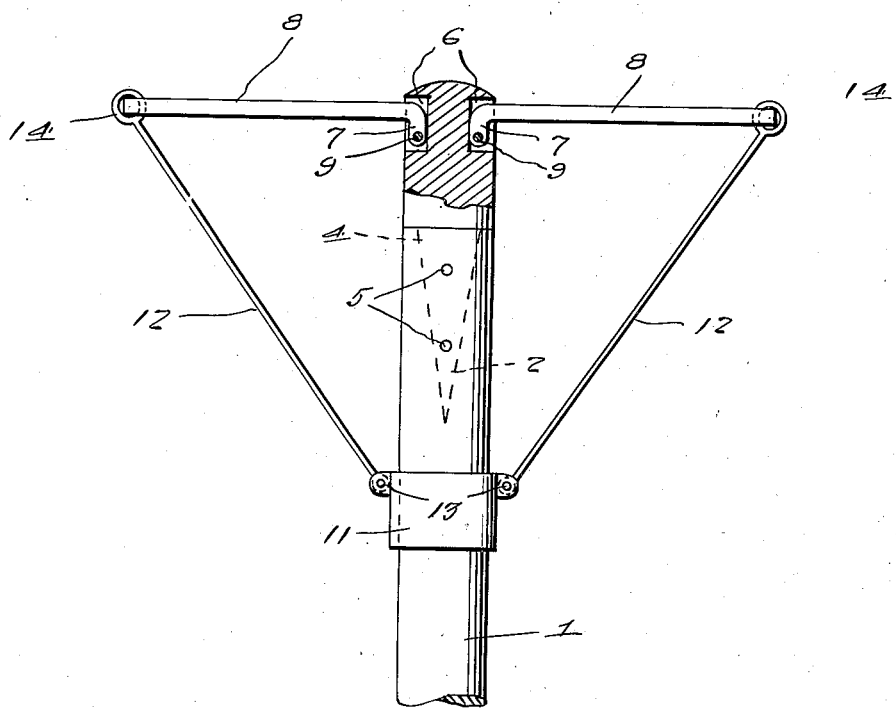
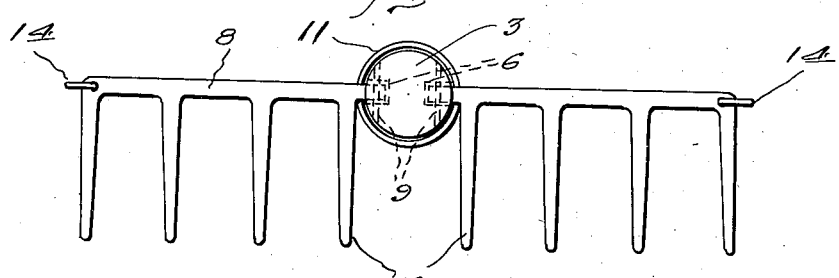
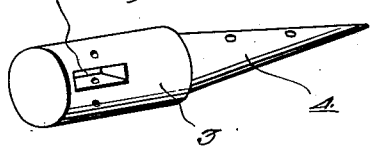
Inventor
Kazumi Muranaka
By Clarence A. O'Brien
Hyman Berman
Attorneys July 6, 1937.  K. MURANAKA  2,086,170
RAKE
Filed Dec. 30, 1936  2 Sheets-Sheet 2
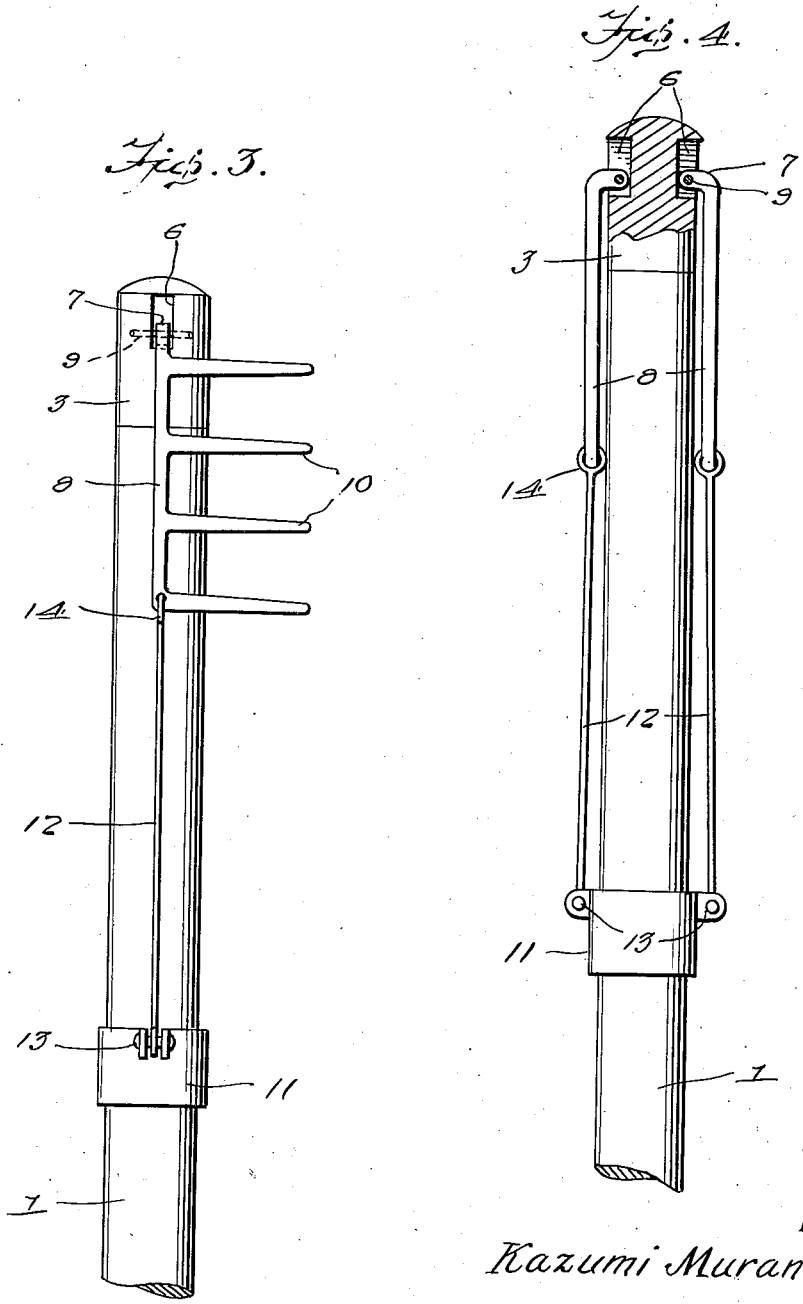
Inventor
Kazumi Muranaka
By Clarence A. O'Brien
Hyman Berman
Attorneys Patented July 6, 1937

2,086,170

UNITED STATES PATENT OFFICE 2,086,170

RAKE

Kazumi Muranaka, Honolulu, Territory of Hawaii

Application December 30, 1936, Serial No. 118,403

2 Claims. (Cl. 55—10)

The present invention relates to new and useful improvements in hand rakes for use particularly by golfers for smoothing the surface of sand traps on golf courses and has for its primary object to provide, in a manner as hereinafter set forth, a device of this character which, when not in use, may be readily folded or collapsed to facilitate carrying in the usual golf bag.

Other objects of the invention are to provide a rake of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a plan view of a portion of a rake constructed in accordance with the present invention, the head being broken away in section to reveal the mounting of the swinging arms.

Figure 2 is a view in front elevation of the invention.

Figure 3 is a side elevational view, showing the rake folded.

Figure 4 is a view substantially similar to Fig. 1 but showing the rake in folded position.

Figure 5 is a detail view in perspective of the head.

Referring now to the drawings in detail, it will be seen that the embodiment of the invention which has been illustrated comprises a handle 1 of suitable length, diameter and material having a substantially conical socket 2 in one end. Mounted on this end of the handle 1 is a head 3, also of any suitable material, said head including an integral, substantially conical shank 4 engaged in the socket 2 and anchored, as at 5.

In diametrically opposite sides the head 3 has formed therein sockets 6 in which the right angularly extending inner end portions 7 of a pair of metallic arms 8 are secured for swinging movement in a horizontal plane through the medium of pins or the like 9. Formed integrally with the arms 8 are spaced teeth 10.

The reference numeral 11 designates a ring which is slidably mounted on the handle 1. Rods 12 are pivotally connected at one end, as at 13, to diametrically opposite sides of the slidable ring 11. At their other ends the rods 12 terminate in eyes 14 which are loosely connected to the free end portions of the arms 8. It will thus be seen that the arms 8 are connected to the slidable ring 11 for actuation thereby.

It is thought that the manner of using the tool will be readily apparent from a consideration of the foregoing. When the rake is to be used, the ring 11 is moved forwardly on the handle 1 to swing the toothed arms 8 outwardly to a position substantially at right angles to said handle through the medium of the rods 12, as best seen in Fig. 1 of the drawings. Outward swinging movement of the arms 8 beyond this position is prevented by the engagement of the right angularly extending inner end portions 7 of said arms with the inner walls of the sockets 6. After the rake has been used it may be conveniently folded in a manner to require a minimum of space by simply shifting the slidable ring 11 rearwardly on the handle 1, thereby swinging the toothed arms 8 inwardly and rearwardly to a position adjacent said handle 1, as seen in Figs. 3 and 4 of the drawings. With the rake in folded position a suitable cover (not shown) may be placed over the toothed arms 8, the rods 12, the ring 11, etc.

It is believed that the many advantages of a rake constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A rake comprising a handle, a head on one end of said handle having sockets in diametrically opposite sides thereof, a pair of toothed arms including substantially right angularly extending inner end portions pivotally secured in the sockets, said substantially right angularly extending inner end portions of the arms being engageable with the inner ends of the sockets for limiting the swinging movement of said arms in one direction, a ring slidably mounted on the handle, and rods pivotally connected, at one end, to said ring and at their other ends to the free end portions of the arms for connecting said arms to the ring for actuation thereby.

2. A rake of the class described comprising an elongated handle having a substantially conical socket in one end thereof, a head mounted on said one end of the handle and including a substantially conical shank anchored in the socket, said head having sockets in diametrically opposite sides thereof, a pair of arms including substantially right angularly extending inner end portions pivotally secured in the second named sockets and engageable with the inner ends thereof for limiting the swinging movement of said arms in one direction, spaced teeth on the arms, a ring slidably mounted on the handle, rods pivotally connected, at one end, to diametrically opposite sides of said ring, and eyes on the other ends of the rods loosely connected to the free end portions of the arms, said rods constituting means for connecting the arms to the ring for actuation thereby.

KAZUMI MURANAKA.